US009019982B2

(12) United States Patent
Nishio et al.

(10) Patent No.: US 9,019,982 B2
(45) Date of Patent: Apr. 28, 2015

(54) WIRELESS COMMUNICATION BASE STATION DEVICE, WIRELESS COMMUNICATION TERMINAL DEVICE AND CCE ALLOCATION METHOD

(75) Inventors: Akihiko Nishio, Kanagawa (JP); Seigo Nakao, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 299 days.

(21) Appl. No.: 13/143,388

(22) PCT Filed: Jan. 28, 2010

(86) PCT No.: PCT/JP2010/000500
§ 371 (c)(1),
(2), (4) Date: Jul. 6, 2011

(87) PCT Pub. No.: WO2010/087177
PCT Pub. Date: Aug. 5, 2010

(65) Prior Publication Data
US 2011/0286413 A1    Nov. 24, 2011

(30) Foreign Application Priority Data
Jan. 30, 2009   (JP) ................. 2009-019774

(51) Int. Cl.
H04J 4/00      (2006.01)
H04L 5/00      (2006.01)
H04J 11/00     (2006.01)

(52) U.S. Cl.
CPC ........... H04L 5/0053 (2013.01); H04J 11/0073 (2013.01)

(58) Field of Classification Search
None
See application file for complete search history.

(56) References Cited

U.S. PATENT DOCUMENTS

2004/0160923 A1*  8/2004  Nobukiyo et al. ............ 370/335
2005/0249159 A1* 11/2005  Abraham et al. ............. 370/329

OTHER PUBLICATIONS

3GPP RAN WGI meeting, R1-092468, "Carrier aggregation LTE-Advanced, "Jun.-Jul. 2008.*
3GPP TS 36.211 V8.3.0, "Physical Channels and Modulation (Release 8)," May 2008.
3GPP TS 36.212 V8.3.0, "Multiplexing and channel coding (Release 8)," May 2008.
3GPP TS 36.213 V8.3.0, "Physical layer procedures (Release 8)," May 2008.
3GPP RAN WGI meeting, R1-092468, "Carrier aggregation LTE-Advanced," Jun.-Jul. 2008.

(Continued)

*Primary Examiner* — Kibrom T Hailu
*Assistant Examiner* — James P Duffy
(74) *Attorney, Agent, or Firm* — Pearne & Gordon LLP

(57) ABSTRACT

Disclosed is a wireless communication base station device that can suppress increases in terminal power consumption while being able to perform CCE allocation flexibly. In the device, a search space setting unit (103) sets search space for each wireless communication terminal device that communicates using multiple downlink unit bands. When the aggregation level of a CCE that is allocated control information addressed to the wireless communication terminal devices is less than a threshold value, an allocating unit (106) allocates the control information to a CCE inside the search space established in a single one of the multiple downlink unit bands. When the aggregation level is greater than the threshold value, the control information is allocated distributed to the CCEs inside the search spaces established for each of the multiple downlink unit bands.

6 Claims, 8 Drawing Sheets

(56) References Cited

OTHER PUBLICATIONS

Huawei; 3GPP RAN WGI, R1-090127, "PDCCH design for carrier aggregation," Jan. 2009.

NTT DoCoMo; 3GPP RAN WGI, R1-090311, "DL Layered Control Signal Structure in LTE-Advanced," Jan. 2009.
International Search Report for PCT/JP2010/000500 dated May 11, 2010.

* cited by examiner

| NUMBER OF COMPONENT BANDS | 2 | 3 | 4 | 5 |
|---|---|---|---|---|
| 12CCE SEARCH SPACE | {6,6} | {4,4,4} | {3,3,3,3} | {3,3,2,2,2} |
| 16CCE SEARCH SPACE | {8,8} | {6,5,5} | {4,4,4,4} | {4,3,3,3,3} |

FIG.5

| NUMBER OF COMPONENT BANDS | 2 | 3 | 4 | 5 |
|---|---|---|---|---|
| 12CCE SEARCH SPACE | {8,4} | {4,4,4} | {4,4,2,2} | {4,2,2,2,2} |
| 16CCE SEARCH SPACE | {8,8} | {8,4,4} | {4,4,4,4} | {4,4,4,2,2} |

FIG.7

WIRELESS COMMUNICATION BASE STATION DEVICE, WIRELESS COMMUNICATION TERMINAL DEVICE AND CCE ALLOCATION METHOD

TECHNICAL FIELD

The present invention relates to a radio communication base station apparatus, radio communication terminal apparatus, and CCE allocation method.

BACKGROUND ART

In 3GPP-LTE (3rd Generation Partnership Project Radio Access Long Term Evolution, hereinafter referred to as "LTE"), OFDMA (Orthogonal Frequency Division Multiple Access) is used as a downlink communication method, and SC-FDMA (Single Carrier Frequency Division Multiple Access) is used as an uplink communication method (see Non-Patent Literature 1, 2, and 3, for example).

In LTE, a radio communication base station apparatus (hereinafter abbreviated to "base station") performs communication by allocating a Resource Block (RB) within a system band to a radio communication terminal apparatus (hereinafter abbreviated to "terminal") in time units called subframes. Also, a base station transmits control information for notifying downlink data and uplink data resource allocation results to a terminal. This control information is transmitted to a terminal using a downlink control channel such as a PDCCH (Physical Downlink Control Channel), for example. Here, each PDCCH occupies a resource comprising one or a consecutive plurality of CCEs (Control Channel Elements). In LTE, a number of CCEs occupied by a PDCCH (linked number of CCEs: CCE aggregation level) is selected as one of 1, 2, 4, or 8, according to the number of information bits of control information or the channel state of a terminal. In LTE, a frequency band having a maximum width of 20 MHz is supported as a system bandwidth.

Also, a base station transmits a plurality of PDCCHs simultaneously in order to allocate a plurality of terminals to one subframe. At this time, the base station transmits a CRC bit masked (or scrambled) by a transmission-destination terminal ID, included in a PDCCH, in order to identify a transmission-destination terminal of each PDCCH. Then a terminal performs blind decoding of a PDCCH by demasking (or descrambling) a CRC bit with that terminal's terminal ID in a plurality of PDCCHs for which there is a possibility of that terminal being addressed.

Also, a method has been investigated that limits CCEs subject to blind decoding for each terminal in order to decrease the number of blind decoding operations by a terminal. With this method, a CCE area (hereinafter referred to as "search space") that is subject to blind decoding is limited for each terminal. In LTE, a search space is set randomly for each terminal, and a number of CCEs included within a search space is defined for each PDCCH CCE aggregation level. For example, for CCE aggregation levels 1, 2, 4, and 8, respectively, the number of CCEs included within a search space—that is, the number of CCEs subject to blind decoding—is limited to six candidates (6 (=1×6) CCEs), six candidates (12 (=2×6) CCEs), two candidates (8 (=4×2) CCEs), and two candidates (16 (=8×2) CCEs), respectively. By this means, each terminal need only perform blind decoding on CCEs within a search space allocated to that terminal, enabling the number of blind decoding operations to be decreased. Here, a search space of each terminal is set using a terminal ID of each terminal, and a hash function, which is a function that performs randomization.

Also, standardization has begun on 3GPP LTE-Advanced (hereinafter referred to as "LTE-A"), which implements still higher communication speeds than LTE. In LTE-A, a maximum downlink transmission speed of 1 Gbps or above and a maximum uplink transmission speed of 500 Mbps or above are implemented, offering the prospect of base stations and terminals (hereinafter referred to as "LTE+ terminals") capable of communication at a wideband frequency of 40 MHz or above being introduced. Also, an LTE-A system is required to accommodate not only LTE+ terminals but also terminals compatible with an LTE system (hereinafter referred to as "LTE terminals").

In LTE-A, a band aggregation method has been proposed whereby a plurality of frequency bands are aggregated in performing communication in order to implement wideband communication of 40 MHz or above (see Non-Patent Literature 1, for example). For example, a frequency band having a width of 20 MHz is assumed as a basic communication band unit (hereinafter referred to as a "component band"). Therefore, in LTE-A, for example, a 40 MHz system bandwidth is implemented by aggregating two component bands. Also, both an LTE terminal and an LTE+ terminal can be accommodated in one component band.

Also, in LTE-A, the following two methods have been investigated as notifying methods whereby resource allocation information of each component band is notified to a terminal from a base station (see Non-Patent Literature 4, for example). In the first notifying method, a base station notifies resource allocation information of a plurality of component bands to a terminal using a downlink component band of each component band. Then a terminal that performs wideband transmission (a terminal that uses a plurality of component bands) obtains resource allocation information of a plurality of component bands by receiving a PDCCH placed in a downlink component band of each component band.

On the other hand, in the second notifying method, a base station notifies resource allocation information of a plurality of component bands to a terminal using only one downlink component band (20 MHz component band). Then a terminal that performs wideband transmission (a terminal that uses a plurality of component bands) obtains resource allocation information of a plurality of component bands by receiving only a PDCCH placed in one downlink component band. In this case, a terminal need only receive a PDCCH placed in one downlink component band, enabling the number of blind decoding operations to be decreased.

CITATION LIST

Non-Patent Literature

NPL 1
3GPP TS 36.211 V8.3.0, "Physical Channels and Modulation (Release 8)," May 2008
NPL 2
3GPP TS 36.212 V8.3.0, "Multiplexing and channel coding (Release 8)," May 2008
NPL 3
3GPP TS 36.213 V8.3.0, "Physical layer procedures (Release 8)," May 2008
NPL 4
3GPP TSG RAN WG1 meeting, R1-082468, "Carrier aggregation LTE-Advanced," July 2008

SUMMARY OF INVENTION

Technical Problem

Here, in LTE-A, when a base station notifies resource allocation information of a plurality of component bands to a terminal using only a PDCCH placed in one component band, one possibility is to set one component band from among the plurality of component bands used by the terminal as the terminal's main band (Anchor band). In this case, a base station allocates resource allocation information for each terminal to a CCE within a search space set within the anchor band of each terminal, and transmits a PDCCH signal that includes resource allocation information.

Also, a search space of each terminal in LTE-A is set randomly on a subframe-by-subframe basis in the same way as in LTE. Here, if a CCE within a search space of a certain terminal (for example, terminal A) has been allocated to another terminal, the base station cannot allocate a CCE to terminal A, and cannot transmit a PDCCH signal addressed to terminal A in that subframe. In the following description, not being able to perform CCE allocation for a certain terminal due to CCE allocation for another terminal is referred to as a CCE allocation block.

Also, in LTE-A, since resource (RB) allocation of a plurality of component bands is performed using one PDCCH, the number of information bits of a PDCCH for LTE-A is greater than the number of information bits of a PDCCH for LTE, in which resource (RB) allocation of only one component band is performed. Furthermore, in LTE-A, when a data block (transport block) is transmitted in each component band, notifying of an MCS (Modulation and Coding Scheme) level or HARQ (Hybrid Automatic Repeat reQuest) information, or suchlike control information, is necessary for each component band. Consequently, the number of information bits of a PDCCH for LTE-A may be further increased. That is to say, in LTE-A, it is necessary to allocate more CCEs to one PDCCH signal. For example, of PDCCH CCE aggregation levels 1, 2, 4, and 8 defined in LTE, there is a higher probability of a base station allocating more CCEs, such as CCE aggregation level 4 or 8, to a PDCCH signal to one LTE+ terminal. Also, in LTE-A, there is a possibility of twelve CCEs or 1 six CCEs (that is, when the CCE aggregation level is 12 or 16), exceeding the maximum CCE aggregation level of 8 defined in LTE, being used.

In this case, since more CCEs are used in a PDCCH signal to an LTE+ terminal, there is a high probability of a CCE of a component band (anchor band) set in that LTE+ terminal being occupied by an LTE+ terminal, and of CCE allocation for another terminal such as an LTE terminal being blocked. In particular, since an LTE terminal can only use one component band while an LTE+ terminal can use a plurality of component bands, if CCE allocation for an LTE terminal in one component band is blocked, a base station becomes unable to transmit data to that LTE terminal. Thus, when the CCE aggregation level of a PDCCH signal to an LTE+ terminal is high (that is, when the number of control information bits is large), constraints on scheduling for LTE terminal CCE allocation increase, and LTE terminal throughput degrades.

Here, one possibility is to improve the degree of freedom of CCE allocation to a terminal by distributing CCEs to which a PDCCH signal to an LTE+ terminal is allocated across the entire plurality of component bands. That is to say, since LTE+ terminal CCE allocation is distributed among a plurality of component bands, constraints on scheduling for LTE terminal CCE allocation decrease in each component band. However, in this case, it is necessary for an LTE+ terminal to receive a PDCCH signal in a plurality of component bands at all times, resulting in an increase in LTE+ terminal power consumption.

It is an object of the present invention to provide a base station, terminal, and CCE allocation method that enable CCE allocation to be performed flexibly while suppressing an increase in terminal power consumption.

Solution to Problem

A base station of the present invention employs a configuration having: a setting section that, for a radio communication terminal apparatus that communicates using a plurality of downlink component bands, sets a search space for each radio communication terminal apparatus; and an allocation section that, when an aggregation level of a CCE to which control information addressed to the radio communication terminal apparatus is allocated is less than or equal to a threshold value, allocates the control information to a CCE within the search space set in one downlink component band among the plurality of downlink component bands, and when the aggregation level is greater than the threshold value, allocates the control information distributed among CCEs within the search spaces set in the plurality of downlink component bands.

A terminal of the present invention is a radio communication terminal apparatus that communicates using a plurality of downlink component bands, and employs a configuration having: a calculation section that calculates a search space of this terminal; and a decoding section that, when an aggregation level of a CCE to which control information addressed to this apparatus is allocated is less than or equal to a threshold value, performs blind decoding of a CCE within the search space set in one downlink component band among the plurality of downlink component bands, and when the aggregation level is greater than the threshold value, performs blind decoding of CCEs within the search spaces set in the plurality of downlink component bands, and thereby obtains the control information addressed to this apparatus.

A CCE allocation method of the present invention has: a setting step of, for a radio communication terminal apparatus that communicates using a plurality of downlink component bands, setting a search space for each radio communication terminal apparatus; and an allocation step of, when an aggregation level of a CCE to which control information addressed to the radio communication terminal apparatus is allocated is less than or equal to a threshold value, allocating the control information to a CCE within the search space set in one downlink component band among the plurality of downlink component bands, and when the aggregation level is greater than the threshold value, allocating the control information distributed among CCEs within the search spaces set in the plurality of downlink component bands.

Advantageous Effects of Invention

The present invention enables CCE allocation to be performed flexibly while suppressing an increase in terminal power consumption.

BRIEF DESCRIPTION OF DRAWINGS

FIG. 5 shows a search space setting method according to setting method 1 of Embodiment 1 of the present invention;

FIG. 7 shows a search space setting method according to setting method 2 of Embodiment 1 of the present invention;

DESCRIPTION OF EMBODIMENTS

Now, embodiments of the present invention will be described in detail with reference to the accompanying drawings. In the embodiments, identical configuration elements are assigned the same reference codes, and duplicate descriptions thereof are omitted.

Embodiment 1

Figure 1:
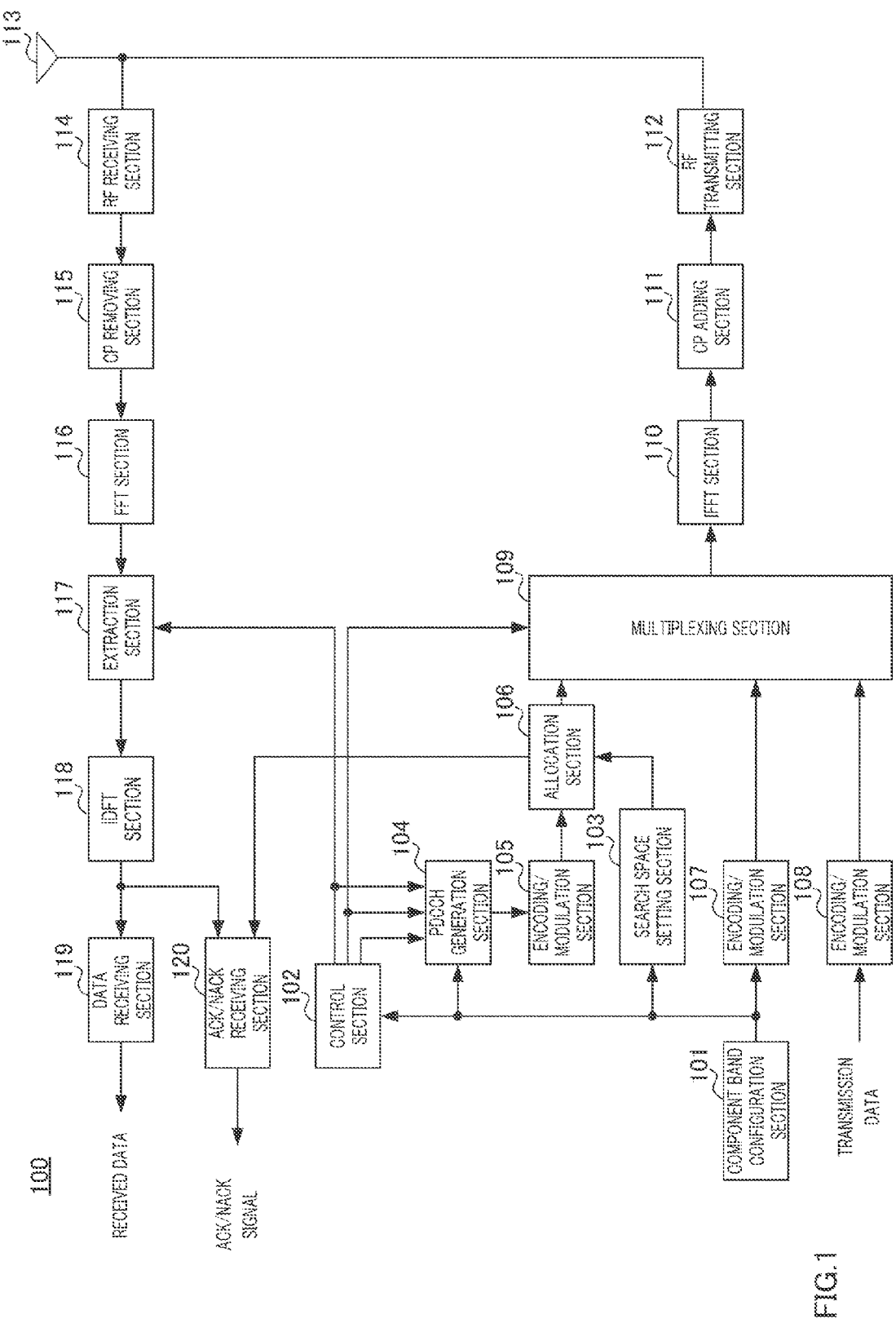
FIG. 1 is a block diagram showing a configuration of a base station according to Embodiment 1 of the present invention.

FIG. 1 is a block diagram showing the configuration of base station 100 according to this embodiment.

In base station 100 shown in FIG. 1, component band configuration section 101 sets (configures) one or a plurality of component bands used in an uplink and downlink respectively for each terminal, in accordance with a desired transmission rate or data transmission amount, for example. Here, component band setting section 101 configures one component band for an LTE terminal, and configures a plurality of component bands for an LTE+ terminal. Also, component band setting section 101 configures one component band among a plurality of component bands configured for an LTE+ terminal as an anchor band of that LTE+ terminal. Then component band setting section 101 outputs configuration information including information on component bands configured for each terminal to control section 102, search space setting section 103, PDCCH generation section 104, and encoding/modulation section 107.

Control section 102 generates control information according to a number of component bands shown in configuration information input from component band configuration section 101. For example, for a terminal for which only one component band has been configured, control section 102 generates control information including one item of MCS information corresponding to one transport block, resource (RB) allocation information of one component band, and one item of HARQ information. On the other hand, for a terminal for which a plurality of component bands have been configured, control section 102 generates control information including a plurality of MCS information items corresponding to a plurality of transport blocks transmitted in the plurality of component bands, resource (RB) allocation information of the plurality of component bands, and a plurality of HARQ information items. Here, as resource allocation information, control section 102 generates uplink resource allocation information indicating an uplink resource (for example, a PUSCH (Physical Uplink Shared Channel)) to which terminal uplink data is allocated, and downlink resource allocation information indicating a downlink resource (for example, a PDSCH (Physical Downlink Shared Channel)) to which downlink data addressed to a terminal is allocated. Then, of the generated control information, control section 102 outputs MCS information and HARQ information to PDCCH generation section 104, outputs uplink resource allocation information to PDCCH generation section 104 and extraction section 117, and outputs downlink resource allocation information to PDCCH generation section 104 and multiplexing section 109.

Search space setting section 103 sets a search space for each terminal based on information on component bands configured for each terminal, indicated by configuration information input from component band configuration section 101. For example, for an LTE terminal (a terminal that uses one component band), search space setting section 103 calculates a search space in a component band configured for that LTE terminal from a CCE number calculated using the terminal ID of the LTE terminal and a hash function that performs randomization, and a number of CCEs (L) included within a search space. Also, for an LTE+ terminal (a terminal that uses a plurality of component bands), if the aggregation level of a CCE to which control information (a PDCCH signal) has been allocated (that is, the PDCCH signal CCE aggregation level) is less than or equal to a threshold value, search space setting section 103 calculates an LTE+ terminal search space in an anchor band configured for that LTE+ terminal in the same way as for an LTE terminal as described above. On the other hand, if the control signal (PDCCH signal) CCE aggregation level is greater than the threshold value, search space setting section 103 sets a search space across a plurality of component bands configured for that LTE+ terminal. Then search space setting section 103 outputs search space information indicating the set search space of each terminal to allocation section 106. Details of the search space setting method used by search space setting section 103 will be given later herein.

PDCCH generation section 104 generates a PDCCH signal that includes uplink resource allocation information, downlink resource allocation information, MCS information, and HARQ information input from control section 102. At this time, PDCCH generation section 104 adds CRC bits to uplink resource allocation information and downlink resource allocation information, and also masks (or scrambles) CRC bits with a terminal ID in generating a PDCCH signal. Then PDCCH generation section 104 outputs a masked PDCCH signal to encoding/modulation section 105.

Encoding/modulation section 105 modulates a PDCCH signal input from PDCCH generation section 104 after channel encoding, and outputs a modulated PDCCH signal to allocation section 106. Here, encoding/modulation section 105 sets a coding rate so that adequate reception quality is obtained by each terminal, based on channel quality information (a CQI: Channel Quality Indicator) notifies from each terminal. For example, the nearer the location of a terminal to a cell boundary (the poorer the channel quality of a terminal), the lower is the coding rate set by encoding/modulation section 105.

Allocation section 106 allocates a PDCCH signal of each terminal input from encoding/modulation section 105 to a CCE within a search space of each terminal indicated by search space information input from search space setting section 103. Here, the CCE aggregation level of one PDCCH signal differs according to the coding rate and the number of bits (amount of control information) of the PDCCH signal. For example, since the coding rate of a PDCCH signal addressed to a terminal located in the vicinity of a cell boundary is set low, and more physical resources are necessary, allocation section 106 allocates a PDCCH signal addressed to a terminal located in the vicinity of a cell boundary to a greater number of CCEs. Also, for an LTE+ terminal, if the CCE aggregation level of a PDCCH signal is less than or equal to a threshold value, allocation section 106 allocates the PDCCH signal to a CCE within a search space set in an anchor band among a plurality of downlink component bands. On the other hand, if the CCE aggregation level of a PDCCH signal is greater than the threshold value, allocation section 106 allocates the PDCCH signal distributed among CCEs within search spaces set in the plurality of downlink component bands. Then allocation section 106 outputs a PDCCH signal allocated to a CCE to multiplexing section 109. Also, allocation section 106 outputs information indicating a CCE to which a PDCCH signal has been allocated to ACK/NACK receiving section 120. Details of CCE allocation processing performed by allocation section 106 will be given later herein.

Encoding/modulation section 107 modulates configuration information input from component band configuration section 101 after channel encoding, and outputs modulated configuration information to multiplexing section 109.

Encoding/modulation section 108 modulates input transmission data (downlink data) after channel encoding, and outputs a modulated transmission data signal to multiplexing section 109.

Multiplexing section 109 multiplexes a PDCCH signal input from allocation section 106, configuration information input from encoding/modulation section 107, and a data signal (that is, a PDSCH signal) input from encoding/modulation section 108. Here, multiplexing section 109 maps a PDCCH signal and data signal (PDSCH signal) to each downlink component band based on downlink resource allocation information input from control section 102. Multiplexing section 109 may also map configuration information to a PDSCH. Then multiplexing section 109 outputs a multiplex signal to IFFT (Inverse Fast Fourier Transform) section 110.

IFFT section 110 converts a multiplex signal input from multiplexing section 109 to a time waveform, and CP (Cyclic Prefix) adding section 111 obtains an OFDM signal by adding a CP to this time waveform.

RF transmitting section 112 executes transmission radio processing (up-conversion, digital/analog (D/A) conversion, and so forth) on an OFDM signal input from CP adding section 111, and transmits the resulting signal via antenna 113.

On the other hand, RF receiving section 114 executes radio reception processing (down-conversion, analog/digital (A/D) conversion, and so forth) on a received radio signal received in a reception band via antenna 113, and outputs the obtained received signal to CP removing section 115.

CP removing section 115 removes a CP from the received signal, and FFT (Fast Fourier Transform) section 116 converts the received signal without a CP to a frequency-domain signal.

Extraction section 117 extracts uplink data from a frequency-domain signal input from FFT section 116 based on uplink resource allocation information input from control section 102, and IDFT (Inverse Discrete Fourier Transform) section 118 converts an extracted signal to a time-domain signal, and outputs that time-domain signal to data receiving section 119 and ACK/NACK receiving section 120.

Data receiving section 119 decodes a time-domain signal input from IDFT section 118. Then data receiving section 119 outputs decoded uplink data as received data.

From a time-domain signal input from IDFT section 118, ACK/NACK receiving section 120 extracts an ACK/NACK signal from each terminal correspond to downlink data (a PDSCH signal) from an uplink control channel (for example, a PUCCH (Physical Uplink Control Channel)) associated with a CCE used for allocation of that downlink data, based on information input from allocation section 106. Then ACK/NACK receiving section 120 performs ACK/NACK determination for an extracted signal. Here, a CCE and PUCCH are associated in order to make efficient use of downlink channel communication resources by eliminating the need for signaling for notifying a PUCCH used by a terminal for ACK/NACK signal transmission from a base station to each terminal. Therefore, each terminal determines a PUCCH to use for transmission of an ACK/NACK signal from that terminal from a CCE to which control information (a PDCCH signal) to that terminal is mapped in accordance with this association. Here, when base station 100 allocates a PDCCH signal that includes downlink resource allocation information of downlink data (a PDSCH signal) of a plurality of component bands to a CCE of a downlink component band of a plurality of component bands, ACK/NACK receiving section 120 extracts a plurality of ACK/NACK signals from a PUCCH associated with the CCE number of each CCE.

Figure 2:
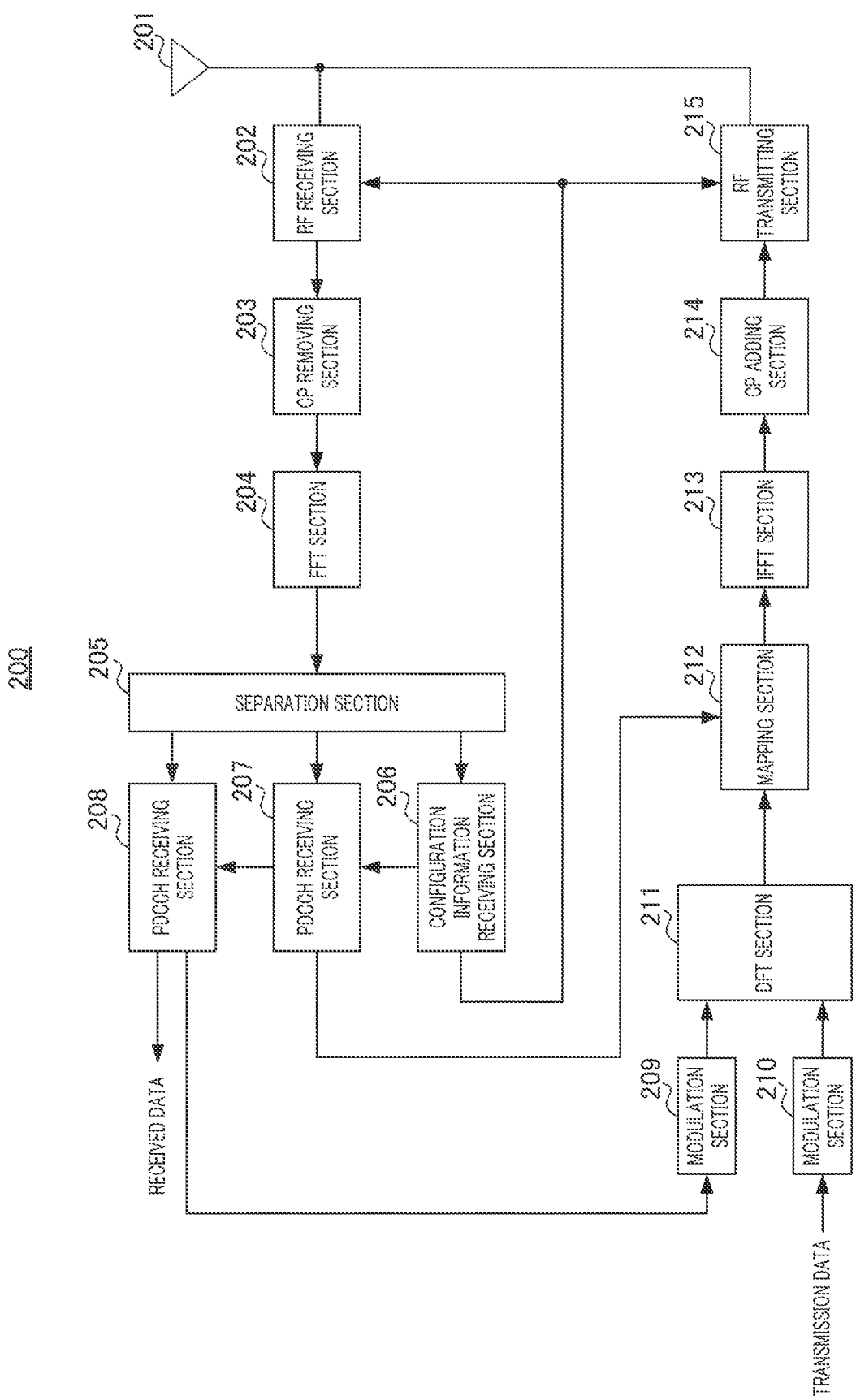
FIG. 2 is a block diagram showing a configuration of a terminal according to Embodiment 1 of the present invention.

FIG. 2 is a block diagram showing the configuration of terminal 200 according to this embodiment. Terminal 200 is an LTE+ terminal, and receives a data signal (downlink data) using a plurality of downlink component bands, and transmits an ACK/NACK signal for that data signal to base station 100 using a PUCCH of one uplink component band.

In terminal 200 shown in FIG. 2, RF receiving section 202 is configured so as to enable a change of reception band, and changes a reception band based on band information input from configuration information receiving section 206. Then RF receiving section 202 executes radio reception processing (down-conversion, analog/digital (A/D) conversion, and so forth) on a received radio signal (here, an OFDM signal) received in a reception band via antenna 201, and outputs the obtained received signal to CP removing section 203.

CP removing section 203 removes a CP from the received signal, and FFT section 204 converts the received signal without a CP to a frequency-domain signal. This frequency-domain signal is output to separation section 205.

Separation section 205 separates a signal input from FFT section 204 into an upper-layer control signal that includes configuration information (for example, RRC signaling or the like), a PDCCH signal, and a data signal (that is, a PDSCH signal). Then separation section 205 outputs a control signal to configuration information receiving section 206, outputs a PDCCH signal to PDCCH receiving section 207, and outputs a PDSCH signal to PDSCH receiving section 208.

Configuration information receiving section 206 reads information indicating an uplink component band and downlink component band configured for this terminal from a control signal input from separation section 205, and outputs the read information to PDCCH receiving section 207, RF receiving section 202, and RF transmitting section 215 as band information. Also, configuration information receiving section 206 reads information indicating a terminal ID set for this terminal from a control signal input from separation section 205, and outputs the read information to PDCCH receiving section 207 as terminal ID information. Furthermore, configuration information receiving section 206 reads information indicating an anchor band configured for this terminal, and outputs the read information to PDCCH receiving section 207 as anchor band information.

PDCCH receiving section 207 performs blind decoding of a PDCCH signal input from separation section 205, and obtains a PDCCH signal addressed to this terminal. Here, if the CCE aggregation level of a PDCCH signal addressed to this terminal is less than or equal to a threshold value, the PDCCH signal is allocated to a CCE placed in an anchor band configured for this terminal, indicated by anchor band information input from configuration information receiving section 206. On the other hand, if the CCE aggregation level of a PDCCH signal addressed to this terminal is greater than the threshold value, the PDCCH signal addressed to this terminal is allocated distributed among CCEs placed in a plurality of component bands used by this terminal.

Specifically, PDCCH receiving section 207 first calculates a search space of this terminal for each CCE aggregation level, using the terminal ID of this terminal indicated by terminal ID information input from configuration information receiving section 206. Then PDCCH receiving section 207 performs demodulation and decoding for each CCE for which there is a possibility of a PDCCH within a calculated search space being allocated. Here, in order to set a search space according to a CCE aggregation level, PDCCH receiving section 207 performs demodulation and decoding for a CCE for which there is a possibility of a PDCCH corresponding to each CCE aggregation level being allocated. That is to say, PDCCH receiving section 207 assumes a case in which the CCE aggregation level of a PDCCH signal addressed to this terminal is less than or equal to the threshold value, and performs blind decoding of a CCE within a search space of this terminal set in one downlink component band (anchor band) among a plurality of component bands configured for this terminal. Also, PDCCH receiving section 207 assumes a case in which the CCE aggregation level of a PDCCH signal addressed to this terminal is greater than the threshold value, and performs blind decoding of CCEs within the search spaces of this terminal set in a plurality of downlink component bands configured for this terminal.

Then PDCCH receiving section 207 determines that a PDCCH signal for which CRC=OK (no error) results from masking a CRC bit with the terminal ID of this terminal indicated by terminal ID information is a PDCCH signal addressed to this terminal. PDCCH receiving section 207 then outputs downlink resource allocation information included in a PDCCH signal addressed to this terminal to PDSCH receiving section 208, and outputs uplink resource allocation information to mapping section 212. Also, PDCCH receiving section 207 outputs the CCE number (if the CCE aggregation level is a plurality, the CCE number of the first CCE) of a CCE for which a PDCCH signal addressed to this terminal has been detected (a CCE for which CRC=OK) to mapping section 212.

PDSCH receiving section 208 extracts received data (downlink data) from a PDSCH signal input from separation section 205, based on downlink resource allocation information input from PDCCH receiving section 207. Also, PDSCH receiving section 208 performs error detection on the extracted received data (downlink data). Then PDSCH receiving section 208 generates a NACK signal as an ACK/NACK signal if the result of error detection is that there is an error in the received data, or generates an ACK signal as an ACK/NACK signal if the result of error detection is that there is no error in the received data, and outputs an ACK/NACK signal to modulation section 209.

Modulation section 209 modulates an ACK/NACK signal input from PDSCH receiving section 208, and outputs a modulated ACK/NACK signal to DFT (Discrete Fourier transform) section 211.

Modulation section 210 modulates transmission data (uplink data), and outputs a modulated data signal to DFT section 211.

DFT section 211 converts an ACK/NACK signal input from modulation section 209 and a data signal input from modulation section 210 to the frequency domain, and outputs an obtained plurality of frequency components to mapping section 212.

Mapping section 212 maps a frequency component corresponding to a data signal, from among a plurality of frequency components input from DFT section 211, to a PUSCH placed in an uplink component band, in accordance with uplink resource allocation information input from PDCCH receiving section 207. Also, mapping section 212 maps a frequency component or code resource corresponding to an ACK/NACK signal, from among a plurality of frequency components input from DFT section 211, to a PUCCH placed in an uplink component band, in accordance with a CCE number input from PDCCH receiving section 207.

Modulation section 209, modulation section 210, DFT section 211, and mapping section 212 may also be provided for each component band.

IFFT section 213 converts a plurality of frequency components mapped to a PUSCH to a time-domain waveform, and CP adding section 214 adds a CP to that time-domain waveform.

RF transmitting section 215 is configured so as to enable a change of reception band, and sets a transmission band based on band information input from configuration information receiving section 206. Then RF transmitting section 215 executes transmission radio processing (up-conversion, digital/analog (D/A) conversion, and so forth) on a signal with a CP, and transmits the resulting signal via antenna 201.

A detailed description will now be given of search space setting processing performed by search space setting section 103 of base station 100, and CCE allocation processing performed by allocation section 106.

Figure 3:
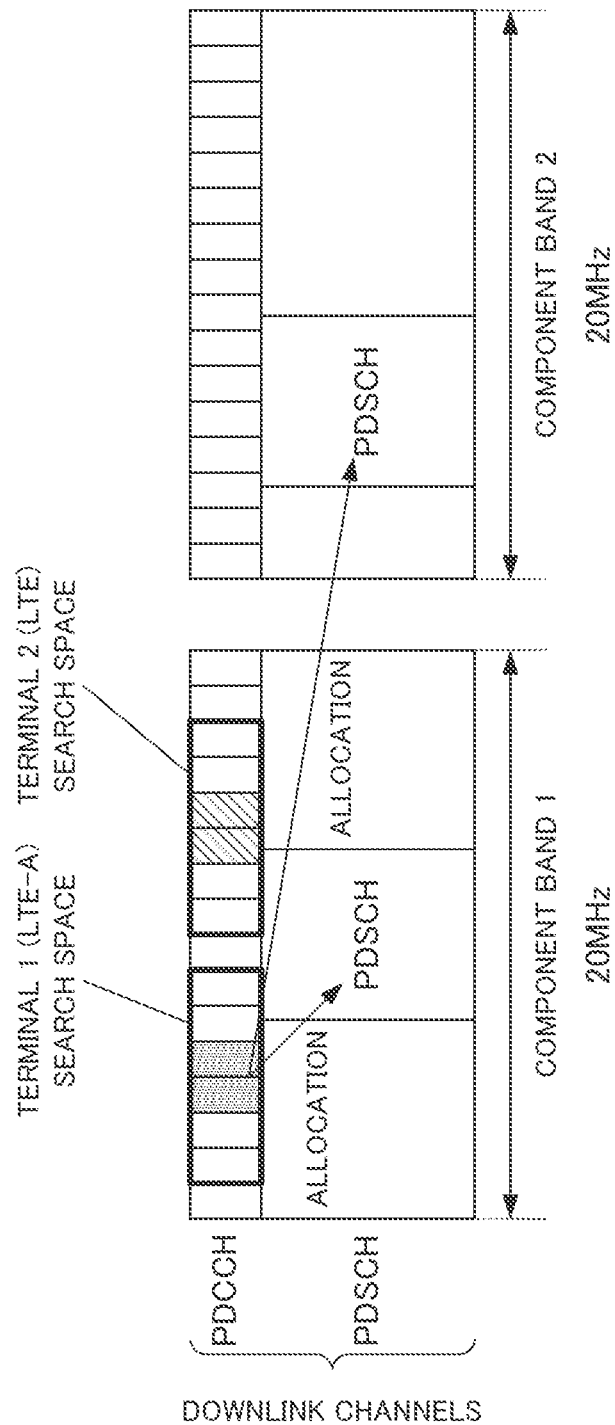
FIG. 3 shows CCE allocation processing according to setting method 1 of Embodiment 1 of the present invention (when a CCE aggregation level is less than or equal to a threshold value)
Figure 4:
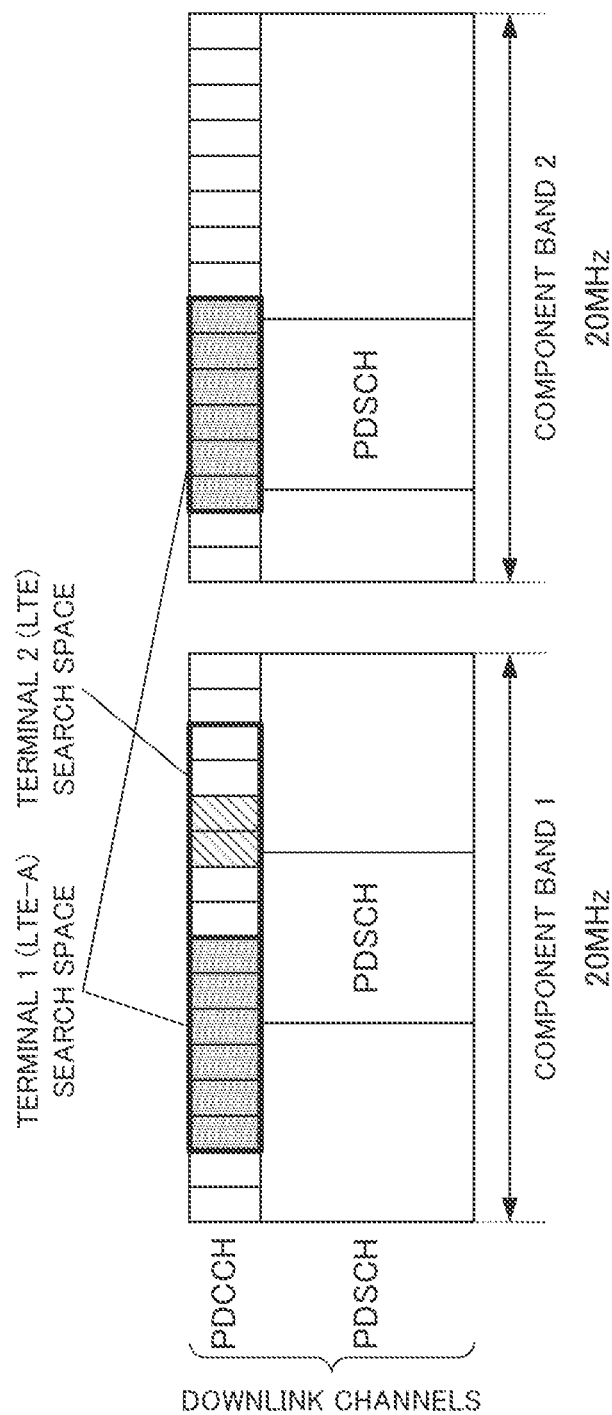
FIG. 4 shows CCE allocation processing according to setting method 1 of Embodiment 1 of the present invention (when a CCE aggregation level is greater than a threshold value)
Figure 6:
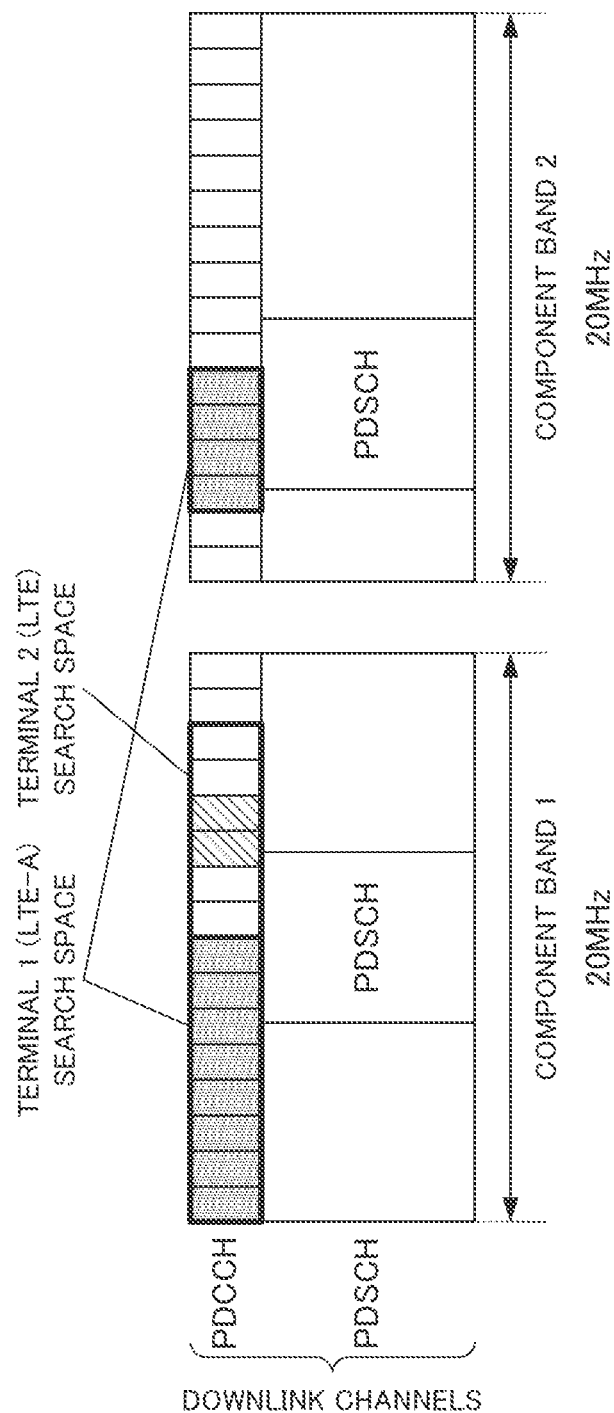
FIG. 6 shows CCE allocation processing according to setting method 2 of Embodiment 1 of the present invention (when a CCE aggregation level is greater than a threshold value)

In the following description, component band configuration section 101 of base station 100 (FIG. 1) configures two downlink component bands (component band 1 and component band 2) each having a width of 20 MHz for terminal 1 (terminal 200—that is, an LTE+ terminal), as shown in FIG. 3, FIG. 4, and FIG. 6. That is to say, terminal 1 (terminal 200) of base station 100 communicates using two downlink component bands. Also, of the two downlink component bands shown in FIG. 3, FIG. 4, and FIG. 6, component band configuration section 101 configures component band 1 as an anchor band of terminal 1 (terminal 200). Also, component band configuration section 101 configures one downlink component band (component band 1) for terminal 2 (an LTE terminal), as shown in FIG. 3, FIG. 4, and FIG. 6.

In the following description, a PDCCH placed in each downlink component band comprises 1 six CCEs, as shown in FIG. 3, FIG. 4, and FIG. 6. Also, the CCE aggregation level of a PDCCH signal indicating PDSCH resource allocation information is made any one of 1, 2, 4, 8, 12, or 16. Furthermore, the CCE aggregation level threshold value is assumed to be eight CCEs. Moreover, in FIG. 3, a PDCCH signal addressed to terminal 1 is allocated to two CCEs (that is, CCE aggregation level: 2), and in FIG. 4 and FIG. 6, a PDCCH signal addressed to terminal 1 is allocated to twelve CCEs (that is, CCE aggregation level: 12). Also, in FIG. 3, FIG. 4, and FIG. 6, a PDCCH signal addressed to terminal 2 is allocated to two CCEs (that is, CCE aggregation level: 2). Furthermore, in FIG. 3, FIG. 4, and FIG. 6, if the PDCCH signal CCE aggregation level is 2, the number of CCEs included within a search space is 6 (that is, there are three candidates), and if the PDCCH signal CCE aggregation level is 12, the number of CCEs included within a search space is 12 (that is, there is one candidate). Similarly, if the PDCCH signal CCE aggregation level is 16, the number of CCEs included within a search space is 16 (that is, there is one candidate).

Search space setting section 103 sets a search space for each terminal (in FIG. 3, FIG. 4, and FIG. 6, terminal 1 and terminal 2). Also, for terminal 1 that communicates using a plurality of downlink component bands, search space setting section 103 sets a search space according to the CCE aggregation level of a PDCCH signal addressed to terminal 1. Then allocation section 106 allocates a PDCCH signal addressed to terminal 1 and a PDCCH signal addressed to terminal 2 to CCEs within search spaces set for each terminal. Below, descriptions are given of search space setting processing and CCE allocation processing by allocation section 106 in search space setting method 1 and setting method 2 in search space setting section 103.

<Setting Method 1>

In this setting method, search space setting is performed so that a number of CCEs included within a search space is uniform in each communication band.

First, a case will be described in which the CCE aggregation level of a PDCCH signal addressed to terminal 1 is less than or equal to a threshold value (eight CCEs) (that is the CCE aggregation level is 1, 2, 4, or 8).

When the CCE aggregation level of a PDCCH signal addressed to terminal 1 is less than or equal to a threshold value (eight CCEs), search space setting section 103 sets a terminal 1 search space in an anchor band configured for terminal 1 (component band 1 shown in FIG. 3). Specifically, as shown in FIG. 3, the CCE aggregation level of a PDCCH signal addressed to terminal 1 is 2 (number of CCEs included within a search space: 6), and therefore search space setting section 103 sets six CCEs of component band 1 (the terminal 1 anchor band) as a terminal 1 search space.

Also, as shown in FIG. 3, the CCE aggregation level of a PDCCH signal addressed to terminal 2 is 2, and therefore search space setting section 103 sets six CCEs of component band 1 (a component band configured for terminal 2) as a terminal 2 search space.

Then, as shown in FIG. 3, allocation section 106 allocates a PDCCH signal addressed to terminal 1 to two CCEs within the terminal 1 search space, and allocates a PDCCH signal addressed to terminal 2 to two CCEs within the terminal 2 search space.

The same kind of arrangement also applies when the CCE aggregation level of a PDCCH signal addressed to terminal 1 is 1, 4, or 8.

Next, a case will be described in which the CCE aggregation level of a PDCCH signal addressed to terminal 1 is greater than a threshold value (eight CCEs) (that is, the CCE aggregation level is 12 or 16).

When the CCE aggregation level of a PDCCH signal addressed to terminal 1 is greater than a threshold value (eight CCEs), search space setting section 103 sets a terminal 1 search space across a plurality of component bands configured for terminal 1 (component band 1 and component band 2 shown in FIG. 4).

Here, when the CCE aggregation level of a PDCCH signal is greater than a threshold value, search space setting section 103 according to this setting method performs search space setting so that a number of CCEs included within a search space is uniform in a plurality of component bands. Specifically, search space setting section 103 sets quantity "floor $(N_{CCE}/M_{CC})$" CCEs, or quantity "ceil$(N_{CCE}/M_{CC})$" CCEs, in each component band as a search space. Here, operator floor (x) represents the largest integer that does not exceed x, and operator ceil(x) represents the smallest integer that exceeds x. Also, $N_{CCE}$ is a PDCCH signal CCE aggregation level, and $M_{CC}$ is a number of component bands configured for a terminal.

For example, a case will be described in which the CCE aggregation level is 12 ($N_{CCE}$=12) (that is, the number of CCEs included within a search space is 12). When the number of component bands configured for a terminal is 2 ($M_{CC}$=2), a search space of that terminal comprises six (=12/2) CCEs of each component band, as shown in FIG. 5. That is to say, search space setting section 103 sets six CCEs each uniformly in two component bands as a search space comprising twelve CCEs. Similarly, as shown in FIG. 5, when the number of component bands configured for a terminal is 3 ($M_{CC}$=3), a search space of that terminal comprises four (=12/3) CCEs of each component band, and when the number of component bands configured for a terminal is 4 ($M_{CC}$=4), a search space of that terminal comprises three (=12/4) CCEs of each component band. Also, as shown in FIG. 5, when the number of component bands configured for a terminal is 5 ($M_{CC}$=5), a search space of that terminal comprises three (=ceil(12/5)) CCEs of two component bands and 2 (=floor(12/5)) CCEs of three component bands—that is, search space configuration is performed so that the number of CCEs of each component band is virtually uniform.

As shown in FIG. 5, the same kind of arrangement also applies when the CCE aggregation level is 16 ($N_{CC}E$=16) (that is, the number of CCEs included within a search space is 16).

Therefore, in FIG. 4, since the CCE aggregation level of a PDCCH signal addressed to terminal 1 is 12 ($N_{CCE}$=12), and the number of component bands is 2 ($M_{CC}$=2), search space setting section 103 sets six CCEs of component band 1 and six CCEs of component band 2 as a terminal 1 search space. Search space setting section 103 sets six CCEs of component band 1 (a component band configured for terminal 2) as a terminal 2 search space, in the same way as in FIG. 3.

Then, as shown in FIG. 4, allocation section 106 performs distributed allocation of a PDCCH signal addressed to terminal 1 to six CCEs within a terminal 1 search space set in component band 1 and six CCEs within a terminal 1 search space set in component band 2. Also, as shown in FIG. 4, allocation section 106 allocates a PDCCH signal addressed to terminal 2 to two CCEs within a terminal 2 search space set in component band 1, in the same way as in FIG. 3.

That is to say, as shown in FIG. 3, when the CCE aggregation level of a PDCCH signal addressed to terminal 1 is less than or equal to a threshold value, allocation section 106 allocates a PDCCH signal addressed to terminal 1 to a CCE within a search space set in one component band (component band 1 (an anchor band) shown in FIG. 3) of a plurality of component bands used by terminal 1 (component band 1 and component band 2 shown in FIG. 3). On the other hand, as shown in FIG. 4, when the CCE aggregation level of a PDCCH signal addressed to terminal 1 is greater than the threshold value, allocation section 106 allocates a PDCCH signal addressed to terminal 1 to CCEs within search spaces set in the plurality of component bands used by terminal 1 (component band 1 and component band 2 shown in FIG. 4).

That is to say, base station 100 transmits a PDCCH signal distributed among a plurality of component bands only to an LTE+ terminal requiring a CCE aggregation level to be greater than a threshold value. In other words, base station 100 transmits a PDCCH signal concentrated into one component band to an LTE terminal for which a CCE aggregation level is less than or equal to a threshold value.

By this means, the number of CCEs per component band to which a PDCCH signal is allocated can be decreased even if the CCE aggregation level of a PDCCH signal addressed to an LTE+ terminal is greater than a threshold value. Specifically, even if the CCE aggregation level of a PDCCH signal is greater than a threshold value, the CCE aggregation level of a PDCCH signal per component band is less than or equal to eight CCEs. That is to say, the number of CCEs to which a PDCCH signal is allocated in each component band is less than or equal to 8 for both an LTE terminal and an LTE+ terminal. Thus, it no longer happens that an LTE+ terminal requiring a PDCCH signal CCE aggregation level to be greater than a threshold value occupies one component band, and therefore the probability of CCE allocation of an LTE terminal (in FIG. 4, terminal 1 set to component band 1) being blocked is reduced in each component band. Thus, scheduling constraints on LTE terminal CCE allocation are alleviated, enabling LTE terminal throughput to be improved.

Also, when the CCE aggregation level of a PDCCH signal addressed to an LTE+ terminal is less than or equal to a threshold value, the LTE+ terminal receives a PDCCH signal in one component band. That is to say, an LTE+ terminal need only receive a PDCCH signal (narrowband signal) in a minimum necessary band, enabling power consumption at the time of PDCCH signal reception to be minimized.

Furthermore, there is a high probability of an LTE+ terminal requiring a CCE aggregation level to be greater than a threshold value being a terminal that performs data communication in a plurality of component bands (that is, a terminal with a large control information size), and being, for example, a terminal that is located in the vicinity of a cell boundary and that has poor channel quality (that requires a low coding rate). Therefore, by having a PDCCH signal addressed to an LTE+ terminal requiring a CCE aggregation level to be greater than a threshold value transmitted distributed among a plurality of component bands, a frequency diversity effect can be obtained by an LTE+ terminal, and a PDCCH signal error rate characteristic can be improved. Furthermore, in this setting method, base station 100 sets CCEs included within a search space uniformly in each component band. By this means, an LTE+ terminal requiring a CCE aggregation level to be greater than a threshold value can receive a PDCCH signal using uniform frequency resources, enabling a greater frequency diversity effect to be obtained.

Also, base station 100 allocates a PDCCH signal addressed to each terminal to a CCE based on CQI information reported from each terminal. For example, there is a high probability of a PDCCH signal addressed to a terminal for which channel quality indicated by CQI information is poor and that requires the PDCCH signal coding rate to be kept low (for example, a terminal in the vicinity of a cell boundary) being allocated to a greater number of CCEs and transmitted distributed among a plurality of component bands by base station 100. In this case, a terminal located in the vicinity of a cell boundary can obtain a frequency diversity effect by receiving a PDCCH signal in a plurality of component bands, and channel time fluctuation between base station 100 and a terminal can be decreased. That is to say, since channel time fluctuation between a base station and a terminal located in the vicinity of a cell boundary is decreased, the terminal's CQI transmission cycle can be made longer. Therefore, the number of transmissions of CQI information to a base station from a terminal located in the vicinity of a cell boundary for which more radio resources (frequency resources and power resources) are necessary for CQI information transmission in an uplink can be decreased. Consequently, overhead due to uplink control information can be reduced, and uplink throughput can be improved. Also, with a terminal located in the vicinity of a cell boundary, CQI measurement is possible by averaging over a long period due to the decrease in channel time fluctuation between base station 100 and the terminal, enabling the accuracy of CQI information to be improved.

Moreover, by making a CCE aggregation level threshold value 8, which is the maximum value of a CCE aggregation level defined in LTE, when the CCE aggregation level of a PDCCH signal addressed to an LTE+ terminal is less than or equal to a threshold value, search space setting and CCE allocation identical to search space setting and CCE allocation in LTE can also be applied to an LTE+ terminal. That is to say, according to this setting method, in LIE-A, new search space setting (for example, FIG. 5) and CCE allocation need only be defined when the CCE aggregation level is greater than the threshold value (that is, when the CCE aggregation level is 12 or 16), enabling a system, base station, and terminal having a simple configuration to be implemented.

Thus, according to this setting method, a base station transmits a PDCCH signal distributed among a plurality of component bands when the CCE aggregation level of a PDCCH signal is greater than a threshold value, and transmits a PDCCH signal in only one component band when the CCE aggregation level of a PDCCH signal is less than or equal to a threshold value. By this means, even when there is a terminal to which a greater number of CCEs have been allocated, a base station can reduce the probability of CCE allocation of another terminal being blocked in each component band, and perform CCE allocation to a plurality of terminals in a flexible manner. Also, each terminal need only receive a PDCCH signal in a plurality of component bands when the CCE aggregation level of a PDCCH signal addressed to that terminal is greater than a threshold value, and power consumption at the time of PDCCH signal reception can be kept to a minimum. Therefore, according to this setting method, CCE allocation can be performed flexibly while suppressing an increase in terminal power consumption.

<Setting Method 2>

In this setting method, search space setting is performed so that CCEs included within a search space are distributed among each component band in one, two, four or eight PDCCH CCE aggregation level units. That is to say, in this setting method, a search space is set so as to be distributed among component bands in CCE aggregation level units defined in LTE.

When the CCE aggregation level of a PDCCH signal addressed to terminal 1 is less than or equal to a threshold value (eight CCEs) (that is, when the CCE aggregation level is 1, 2, 4, or 8), search space setting section 103 performs terminal 1 search space and terminal 2 search space setting in the same way as in setting method 1 (for example, in the case in which the CCE aggregation level is 2 shown in FIG. 3). Then, as shown in FIG. 3, allocation section 106 allocates a PDCCH signal addressed to terminal 1 to two CCEs within a terminal 1 search space, and allocates a PDCCH signal addressed to terminal 2 to two CCEs within a terminal 2 search space, in the same way as in setting method 1.

Next, a case will be described in which the CCE aggregation level of a PDCCH signal addressed to terminal 1 is greater than a threshold value (eight CCEs) (that is, when the CCE aggregation level is 12 or 16).

When the CCE aggregation level of a PDCCH signal addressed to terminal 1 is greater than a threshold value (eight CCEs), search space setting section 103 sets a terminal 1 search space across a plurality of component bands configured for terminal 1 (component band 1 and component band 2 shown in FIG. 6) in the same way as in setting method 1.

However, when the CCE aggregation level of a PDCCH signal is greater than a threshold value, search space setting section 103 according to this setting method performs search space setting so that a number of CCEs included within a search space are distributed among a plurality of component bands in LTE-defined CCE aggregation level units (that is, when the CCE aggregation level is 1, 2, 4, or 8). Also, search space setting section 103 performs search space setting so that the number of CCEs is virtually uniform among the component bands.

For example, a case will be described in which the CCE aggregation level is 12 (the number of CCEs included within a search space is 12). When the number of component bands configured for a terminal is 2, a search space of that terminal comprises eight CCEs of one of the two component bands and four CCEs of the other component band, as shown in FIG. 7. That is to say, search space setting section 103 sets a search space comprising twelve CCEs distributed between LTE-defined CCE aggregation levels (eight CCEs and four CCEs). Similarly, as shown in FIG. 7, when the number of component bands configured for a terminal is 3, a search space of that terminal comprises four CCEs of each component band. Similarly, as shown in FIG. 7, when the number of component bands configured for a terminal is 4, a search space of that terminal comprises four CCEs of two component bands and two CCEs of two component bands. As shown in FIG. 7, the same kind of arrangement also applies when the number of component bands configured for a terminal is 5.

As shown in FIG. 7, the same kind of arrangement also applies when the CCE aggregation level is 16 (the number of CCEs included within a search space is 16).

Therefore, in FIG. 6, since the CCE aggregation level of a PDCCH signal addressed to terminal 1 is 12, and the number of component bands is 2, search space setting section 103 sets eight CCEs of component band 1 and four CCEs of component band 2 as a terminal 1 search space. Search space setting section 103 sets six CCEs of component band 1 (a component band configured for terminal 2) as a terminal 2 search space, in the same way as in FIG. 3.

Then, as shown in FIG. 6, allocation section 106 performs distributed allocation of a PDCCH signal addressed to terminal 1 to eight CCEs within a terminal 1 search space set in component band 1 and four CCEs within a terminal 1 search space set in component band 2. Also, as shown in FIG. 4, allocation section 106 allocates a PDCCH signal addressed to terminal 2 to two CCEs within a terminal 2 search space, in the same way as in FIG. 3.

As shown in FIG. 7, when a PDCCH signal is allocated distributed among a plurality of component bands, a number of CCEs to which a PDCCH signal is allocated in each component band is an LTE-defined CCE aggregation level (that is, when the CCE aggregation level is 1, 2, 4, or 8). By this means, in each component band (in FIG. 6, component band 1 and component band 2), a definition of a search space identical to a search space defined in LTE can also be used for terminal 200 (an LTE+ terminal). That is to say, base station 100 can use the same method as in LTE for PDCCH signal CCE allocation processing, and terminal 200 (an LTE+ terminal) can use the same method as in LTE for PDCCH signal reception processing.

Thus, according to this setting method, in LTE-A, even when an LTE terminal and LTE+ terminal are accommodated in the same component band, the same CCE allocation processing and reception processing can be applied to both terminals. Therefore, according to this setting method, a simpler base station and terminal can be implemented while obtaining the same kind of effect as with setting method 1.

Also, according to this setting method, when a PDCCH signal is allocated distributed among a plurality of component bands, PDCCH signal CCE aggregation levels in the component band are 1, 2 (=1×2), 4 (=1×4 or 2×2) or 8 (=1×8, 2×4, or 4×2)—that is, multiples of each other. Therefore, according to this setting method, even when PDCCH signals with different CCE aggregation levels addressed to a plurality of terminals (an LTE terminal and LTE+ terminal) are allocated to the same component band, the occurrence of an incomplete residual CCE resulting from CCE allocation can be avoided, and downlink resources can be used without waste.

This concludes a description of search space setting processing, and CCE allocation processing by allocation section 106, according to search space setting method 1 and setting method 2.

Thus, according to this embodiment, CCE allocation can be performed flexibly while suppressing an increase in terminal power consumption.

In this embodiment, a case in which the CCE aggregation level of a PDCCH signal is 12 or 16, and a case in which there is one candidate CCE for allocation of a PDCCH signal (that is, the number of CCEs included within a search space is 12 or 16), have been described. However, in the present invention, the number of candidate CCEs for allocation of a PDCCH signal may also be two or more in order to increase the degree of freedom of CCE allocation. For example, if a base station makes the number of candidate CCEs for allocation of a PDCCH signal N (where N is a positive integer), the number of CCEs within a search space in each component band (for example, in FIG. 5 or FIG. 7) should be multiplied by N. Here, the number of CCEs within a search space is set so that the CCE aggregation level within each component band is less than or equal to 8.

Embodiment 2

This embodiment is similar to Embodiment 1 in that, when the CCE aggregation level of a PDCCH signal is less than or equal to a threshold value, the PDCCH signal is allocated to only a CCE of one component band. On the other hand, this embodiment differs from Embodiment 1 in that, when the CCE aggregation level of a PDCCH signal is less than or equal to a threshold value, a search space is set in a plurality of component bands.

This will now be explained in detail. Base station 100 (FIG. 1) and terminal 200 (FIG. 2) according to this embodiment have the same kind of configurations as in Embodiment 1, but the operation of search space setting section 103, allocation section 106, and PDCCH receiving section 207 differs.

With search space setting section 103 of base station 100 (FIG. 1) according to this embodiment, whatever the CCE aggregation level of a PDCCH signal addressed to an LTE+ terminal, a search space is set across a plurality of component bands configured for that LTE+ terminal. For example, if the CCE aggregation level of a PDCCH signal is less than or equal to a threshold value, search space setting section 103 performs search space setting by means of $L'$ ($=L/_{MCC}$) CCEs per component band, where L is a number of CCEs included within a search space corresponding to a certain CCE aggregation level, and $M_{CC}$ is a number of component bands configured for an LTE+ terminal. If the CCE aggregation level of a PDCCH signal is greater than a threshold value, search space setting section 103 performs search space setting in a similar way to Embodiment 1 (using setting method 1 or setting method 2).

CQI information (not shown) reported from terminal 200 is input to allocation section 106. If the CCE aggregation level of a PDCCH signal addressed to an LTE+ terminal is less than or equal to a threshold value, allocation section 106 allocates the PDCCH signal to a CCE within a search space set in one component band with the best channel quality indicated by CQI information from among a plurality of component bands. On the other hand, if the CCE aggregation level of a PDCCH signal addressed to an LTE+ terminal is greater than a threshold value, allocation section 106 allocates the PDCCH signal distributed among CCEs within search spaces set in each of a plurality of component bands, in the same way as in Embodiment 1.

On the other hand, whatever the CCE aggregation level of a PDCCH signal addressed to this terminal, PDCCH receiving section 207 of terminal 200 (FIG. 2) calculates a search space of this terminal set in each of a plurality of component bands, in the same way as search space setting section 103. Then PDCCH receiving section 207 performs blind decoding on a CCE within a search space calculated for each CCE aggregation level.

A detailed description will now be given of search space setting processing performed by search space setting section 103, and CCE allocation processing performed by allocation section 106, of this embodiment.

Figure 8A:
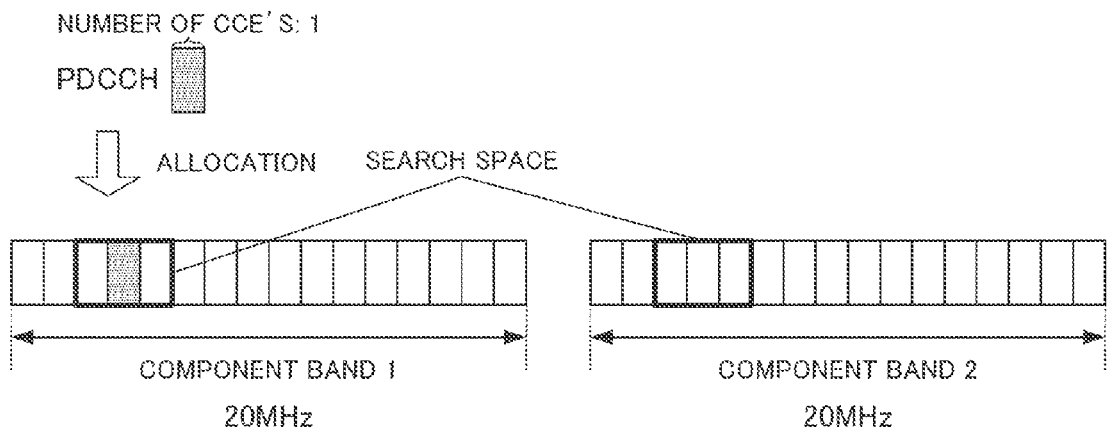
FIG. 8A shows CCE allocation processing according to Embodiment 2 of the present invention (CCE aggregation level: 1)
Figure 8B:
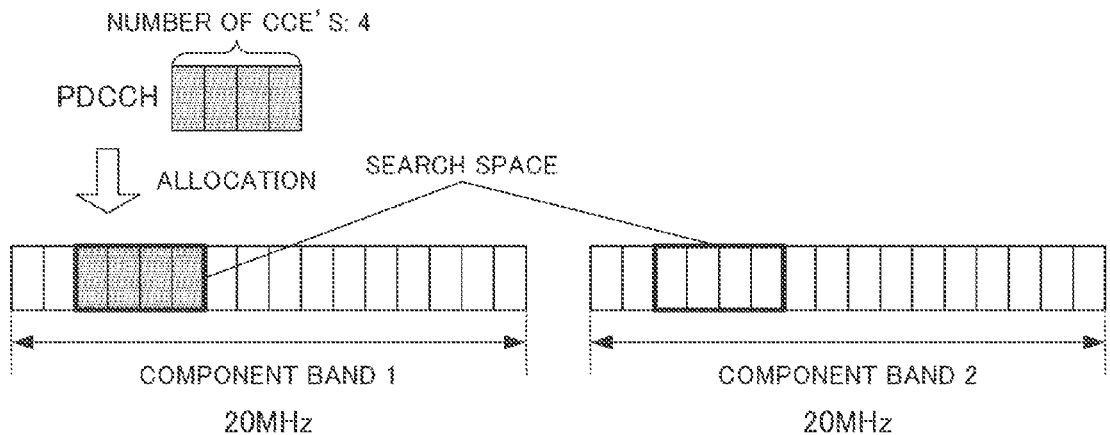
FIG. 8B shows CCE allocation processing according to Embodiment 2 of the present invention (CCE aggregation level: 4)
Figure 8C:
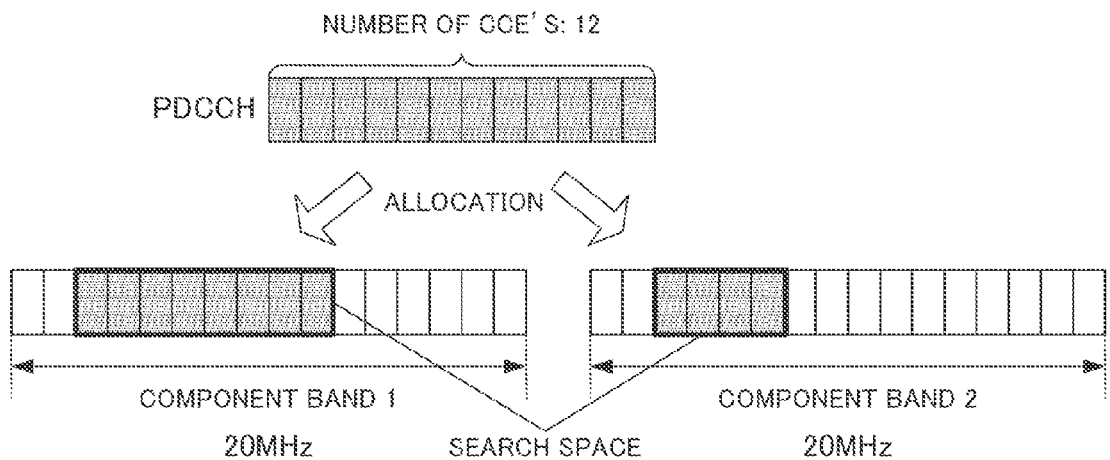
FIG. 8C shows CCE allocation processing according to Embodiment 2 of the present invention (CCE aggregation level: 12).

In the following description, component band configuration section 101 of base station 100 (FIG. 1) configures two downlink component bands (component band 1 and component band 2) for terminal 1 (terminal 200—that is, an LTE+ terminal), as shown in FIG. 8A through FIG. 8C, in the same way as in Embodiment 1 (FIG. 3, FIG. 4, and FIG. 6). Here, FIG. 8A through FIG. 8C show only a PDCCH of the downlink channels (PDCCH and PDSCH) shown in FIG. 3, FIG. 4, and FIG. 6.

In the following description, a PDCCH placed in each downlink component band comprises sixteen CCEs, as shown in FIG. 8A through FIG. 8C. Here, cases are described in which the PDCCH signal CCE aggregation level is 1 (FIG. 8A), 4 (FIG. 8B), and 12 (FIG. 8C). The CCE aggregation level threshold value is assumed to be eight CCEs, as in Embodiment 1. In the case shown in FIG. 8A (PDCCH signal CCE aggregation level: 1), the number of CCEs included within a search space is 6 (that is, there are six candidates); in the case shown in FIG. 8B (PDCCH signal CCE aggregation level: 4), the number of CCEs included within a search space is 8 (that is, there are two candidates); and in the case shown in FIG. 8C (PDCCH signal CCE aggregation level: 12), the number of CCEs included within a search space is 12 (that is, there is one candidate). In FIG. 8A and FIG. 8B, the channel quality of component band 1 is better than the channel quality of component band 2.

First, cases in which the CCE aggregation level is less than or equal to a threshold value (FIG. 8A and FIG. 8B) will be described.

If the CCE aggregation level is less than or equal to the threshold value (eight CCEs) (FIG. 8A and FIG. 8B), search space setting section 103 sets a search space across two component bands ($M_{CC}$=2), component band 1 and component band 2. Specifically, if the CCE aggregation level is 1 (L=6), search space setting section 103 sets three (=L'=L/$M_{CC}$=6/2) CCEs in both component band 1 and component band 2 as search spaces, as shown in FIG. 8A. Similarly, if the CCE aggregation level is 4 (L=8), search space setting section 103 sets four (=L'=8/2) CCEs in both component band 1 and component band 2 as search spaces, as shown in FIG. 8B.

Then, of the search spaces set in the two component bands, component band 1 and component band 2, allocation section 106 allocates a PDCCH signal to a CCE within the search space set in the component band with the better channel quality. Specifically, when the CCE aggregation level is 1, allocation section 106 allocates a PDCCH signal to any 1 CCE within a search space comprising three CCEs set in component band 1 having the better channel quality, as shown in FIG. 8A. Similarly, when the CCE aggregation level is 4, allocation section 106 allocates a PDCCH signal to four CCEs within a search space comprising four CCEs set in component band 1 having the better channel quality, as shown in FIG. 8B.

On the other hand, if the CCE aggregation level is greater than the threshold value (eight CCEs) (FIG. 8C), search space setting section 103 sets a search space across two component bands, component band 1 and component band 2, in the same way as in setting method 2 of Embodiment 1 (FIG. 7), for example. Specifically, as shown in FIG. 8C, search space setting section 103 sets eight CCEs of component band 1 and four CCEs of component band 2 as search spaces. Then, in the same way as in Embodiment 1, allocation section 106 performs distributed allocation of a PDCCH signal to eight CCEs within the search space set in component band 1 and four CCEs within the search space set in component band 2.

As shown in FIG. 8A through FIG. 8C, whatever the CCE aggregation level of a PDCCH signal, a search space is set across a plurality of component bands. However, if the CCE aggregation level of a PDCCH signal is less than or equal to a threshold value (as in FIG. 8A and FIG. 8B), the PDCCH signal is allocated to CCEs within a search space of a component band with better channel quality among search spaces set across a plurality of component bands. On the other hand, if the CCE aggregation level of a PDCCH signal is greater than a threshold value (as in FIG. 8C), the PDCCH signal is allocated distributed among CCEs within search spaces set in a plurality of component bands, in the same way as in Embodiment 1.

By this means, if the CCE aggregation level of a PDCCH signal is less than or equal to a threshold value (as in FIG. 8A and FIG. 8B), base station 100 is able to allocate the PDCCH signal to a component band with the best channel quality among a plurality of component bands—that is, to perform localized allocation. In particular, there is a high probability of a terminal to which fewer CCEs are allocated being a terminal for which channel quality is good and CQI measurement accuracy is high. Consequently, for a terminal for which the CCE aggregation level of a PDCCH signal is less than or equal to a threshold value, base station 100 can further improve PDCCH signal transmission efficiency by allocating a PDCCH signal to one component band with the best channel quality based on CQI information.

On the other hand, if the CCE aggregation level of a PDCCH signal is greater than a threshold value (as in FIG. 8C), base station 100 performs distributed allocation of the PDCCH signal to a plurality of component bands, in the same way as in Embodiment 1. Consequently, it no longer happens that an LTE+ terminal requiring a PDCCH signal CCE aggregation level to be greater than a threshold value occupies one component band, and therefore the probability of CCE allocation of an LTE terminal being blocked can be reduced in each component band, in the same way as in Embodiment 1. In particular, there is a high probability of a terminal to which a greater number of CCEs are allocated being a terminal that is located in the vicinity of a cell boundary, and for which channel quality is poor and CQI measurement accuracy is low. Therefore, by having base station 100 perform distributed allocation of a PDCCH signal to a plurality of component bands, a frequency diversity effect is obtained by terminal 200, and channel time fluctuation between base station 100 and terminal 200 is decreased. Consequently, an error rate characteristic of a PDCCH signal addressed to terminal 200 can be improved.

Thus, according to this embodiment, in the same way as in Embodiment 1, even when there is a terminal to which a greater number of CCEs have been allocated, a base station can reduce the probability of CCE allocation of another terminal being blocked in each component band, and perform CCE allocation to a plurality of terminals in a flexible manner. Moreover, according to this embodiment, when the CCE aggregation level of a PDCCH signal is less than or equal to a threshold value, PDCCH signal transmission efficiency can be improved by means of localized allocation.

In this embodiment, component bands for which a search space is defined among a plurality of component bands may be limited to a number of component bands (for example, two component bands) for which an adequate frequency diversity effect can be obtained.

Also, in this embodiment, the number of CCEs allocated to each component band (the CCE aggregation level in each component band) when the CCE aggregation level of a PDCCH signal is less than or equal to a threshold value may be limited to a CCE aggregation level defined in LTE, in the same way as in setting method 2 of Embodiment 1. By this means, the same kind of effect can be obtained as with setting method 2 of Embodiment 1.

This concludes a description of embodiments of the present invention.

Band aggregation may also be referred to as carrier aggregation. Also, band aggregation is not limited to a case in which consecutive frequency bands are aggregated, and non-consecutive frequency bands may also be aggregated.

In the present invention, a C-RNTI (Cell-Radio Network Temporary Identifier) may be used as a terminal ID.

Also, in the present invention, masking (scrambling) processing may be multiplication between bits (that is, a CRC bit and terminal ID), or may be calculation of mod 2 of the result of adding bits together (that is, the remainder after dividing the addition result by 2).

In the above embodiments, a case has been described in which a component band is defined as a band that has a maximum width of 20 MHz, and is a basic communication band unit. However, a component band may also be defined as follows. For example, a downlink component band may be defined as a band delimited by downlink frequency band information in a BCH (Broadcast Channel) notified from a base station, or a band defined by a distribution width when a PDCCH is subjected to distributed placement in a frequency band. Also, an uplink component band may also be defined as a band delimited by uplink frequency band information in a BCH notified from a base station, or a basic communication band unit of 20 MHz or less that includes a PUSCH near the center and a PUCCH at both ends. A component band may also be referred to as a component carrier in LTE.

In the above embodiments, a case has been described in which a fixed value (in the above embodiments, eight CCEs) is used as a threshold value for a CCE aggregation level. However, in the present invention, a threshold value for a CCE aggregation level is not limited to a fixed value, and a value notified from a base station to each terminal may also be used. Also, in the present invention, a threshold value for a CCE aggregation level is not limited to eight CCEs, and may be a value other than eight CCEs (for example, four CCEs).

In the above embodiments, a case has been described in which a base station determines whether a PDCCH signal is to be transmitted in one downlink component band, or is to be transmitted distributed among a plurality of downlink component bands, based on a threshold value for a CCE aggregation level. However, in the present invention, a base station may also determine a number of downlink component bands in which a PDCCH signal is to be transmitted based on a number of bits of control information or a type of control information, instead of a CCE aggregation level. For example, a base station may transmit a PDCCH signal distributed among a plurality of downlink component bands if the type of control information is control information for a plurality of downlink component bands. Also, for example, a PDCCH signal that notifies control information relating to coordinated transmission whereby data is transmitted to the same terminal from a plurality of base stations requires many information bits and a greater number of CCEs. Consequently, in the case of a PDCCH signal that notifies control information relating to coordinated transmission, a base station may transmit the signal distributed among a plurality of component bands.

In the present invention, with regard to a component band configured as a main band, a component band predetermined by the system (for example, a component band that transmits an SCH or P-BCH) may be configured, a component band common to terminals may be configured on a cell-by-cell basis, or a component band that differs for each terminal may be configured.

An anchor band may also be referred to as an anchor carrier, a master band, or a master carrier.

A CCE described in the above embodiments is a logical resource, and when placed on an actual physical time/frequency resource, CCE distribution is performed across the entire band within a component band. Also, as long as CCEs functioning as logical resources are divided on an individual component band basis, CCE placement on an actual physical time/frequency resource may be distributed across the entire system band (that is, all component bands).

In the above embodiments, a case has been described in which the communication bandwidth of a component band is 20 MHz, but the communication bandwidth of a component band is not limited to 20 MHz.

One or a plurality of uplink component bands set by a base station for each terminal may also be referred to as a UE UL component carrier set, and downlink component bands as a UE DL component carrier set.

Resource allocation information transmitted by means of a PDCCH may also be referred to as DCI (Downlink Control Information).

In the above embodiments, provision is made for a PDCCH to be allocated distributed among CCEs within a search space within one component band, or among CCEs within search spaces within a plurality of component bands, according to a CCE aggregation level. However, the same kind of effect can also be obtained for an arbitrary plurality of resource areas other than component bands by providing for a PDCCH to be allocated distributed among CCEs within one resource area, or CCEs within a plurality of resource areas, according to a CCE aggregation level. For example, it is possible to conceive of a control channel area of a front part of a subframe defined in LTE within one component band (that is, a backward-compatible control channel area), and a control channel area defined as an addition in LTE-A (or a system version subsequent to LTE-A) (that is, a non-backward-compatible control channel area). In this case, provision may be made for deciding whether a PDCCH is allocated to a CCE of a backward-compatible control channel area, or is allocated in a distributed fashion to a CCE of a backward-compatible control channel area and a CCE of a non-backward-compatible control channel area, according to a CCE aggregation level. Alternatively, as another example, it is possible to conceive of a control channel area of a plurality of base stations (relay stations) such as in the case of CoMP (Coordinated Multi Point) transmission whereby data is transmitted to the same terminal from a plurality of base stations or relay stations. In this case, provision may be made for deciding whether a PDCCH is allocated to a CCE of a control channel area of one base station, or is allocated in a distributed fashion to CCEs of control channel areas of a plurality of base stations. It is possible to improve a space diversity effect for a terminal in the vicinity of a cell boundary that requires many CCE resources for control channel transmission. On the other hand, for a terminal in the vicinity of the center of a cell, it is possible to reduce the amount of resource consumption since a PDCCH signal is transmitted by means of a small number of CCEs from one cell, and to simplify control since control of transmission timing across a plurality of base stations or the like is unnecessary.

A mobile station may also be referred to as UE, and a base station as Node B or BS (Base Station). A terminal ID may also be referred to as UE-ID.

In the above embodiments, a case has been described by way of example in which the present invention is configured as hardware, but it is also possible for the present invention to be implemented by software.

The function blocks used in the descriptions of the above embodiments are typically implemented as LSIs, which are integrated circuits. These may be implemented individually as single chips, or a single chip may incorporate some or all of them. Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used.

In the event of the introduction of an integrated circuit implementation technology whereby LSI is replaced by a different technology as an advance in, or derivation from, semiconductor technology, integration of the function blocks may of course be performed using that technology. The application of biotechnology or the like is also a possibility.

The disclosure of Japanese Patent Application No. 2009-019774, filed on Jan. 30, 2009, including the specification, drawings and abstract, is incorporated herein by reference in its entirety.

INDUSTRIAL APPLICABILITY

The present invention is suitable for use in a mobile communication system or the like.

The invention claimed is:

1. A radio communication base station apparatus comprising:
a setting section that, for a radio communication terminal apparatus that communicates using a plurality of downlink component bands, allocates a search space to each the radio communication terminal apparatus; and
an allocation section that, when an aggregation level of control information addressed to the radio communication terminal apparatus is less than or equal to a threshold value, allocates the control information to at least one control channel element (CCE) within a first search space allocated to at least one downlink component band among the plurality of downlink component bands, and when the aggregation level is greater than the threshold value, allocates the control information to CCEs within a second search space allocated so as to be distributed among the plurality of downlink component bands, the aggregation level being a first number of CCEs occupied by the control information, wherein:
the first number of CCEs within the second search space being distributed among the plurality of downlink component bands in units of a second number of CCEs, the second number of CCEs being one of aggregation levels that are less than or equal to the threshold value.

2. The radio communication base station apparatus according to claim 1, wherein the setting section, when the aggregation level is less than or equal to the threshold value, allocates the first search space across the plurality of downlink component bands.

3. The radio communication base station apparatus according to claim 2, wherein the allocation section, when the aggregation level is less than or equal to the threshold value, allocates the control information to the at least one CCE within the first search space allocated to the at least one downlink component band among the plurality of downlink component bands, based on channel quality information.

4. A radio communication terminal apparatus that communicates using a plurality of downlink component bands, the radio communication terminal apparatus comprising:
a calculation section that calculates a search space of the radio communication terminal apparatus; and
a decoding section that, when an aggregation level of control information addressed to the radio communication terminal apparatus is less than or equal to a threshold value, performs blind decoding of at least one control channel element (CCE) within a first search space allocated to at least one downlink component band among the plurality of downlink component bands, and that, when the aggregation level is greater than the threshold value, performs blind decoding of CCEs within a second search space allocated so as to be distributed among the plurality of downlink component bands, and thereby obtains the control information addressed to the radio communication terminal apparatus, the aggregation level being a first number of CCEs occupied by the control information, wherein:
the first number of CCEs within the second search space being distributed among the plurality of downlink component bands in units of a second number of CCEs, the second number of CCEs being one of the aggregation levels that are less than or equal to the threshold value.

5. A control channel element allocation method comprising:
for a radio communication terminal apparatus that communicates using a plurality of downlink component bands, allocating a search space to each the radio communication terminal apparatus; and when an aggregation level of control information addressed to the radio communication terminal apparatus is less than or equal to a threshold value, allocating the control information to at least one control channel element (CCE) within a first search space allocated in at least one downlink component band among the plurality of downlink component bands, and, when the aggregation level is greater than the threshold value, allocating the control information to CCEs within a second search space allocated so as to be distributed among the plurality of downlink component bands, the aggregation level being a first number of CCEs occupied by the control information, wherein:

the first number of CCEs within the second search space being distributed among the plurality of downlink component bands in units of a second number of CCEs, the second number of CCEs being one of aggregation levels that are less than or equal to the threshold value.

6. A control information decoding method in a radio communication terminal apparatus that communicates using a plurality of downlink component bands, the control information decoding method comprising:

calculating a search space of the radio communication terminal apparatus; and when an aggregation level of control information addressed to the radio communication terminal apparatus is less than or equal to a threshold value, performing blind decoding of at least one control channel element (CCE) within a first search space allocated to at least one downlink component band among the plurality of downlink component bands, and, when the aggregation level is greater than the threshold value, performing blind decoding of CCEs within a second search space allocated so as to be distributed among the plurality of downlink component bands, and thereby obtaining the control information addressed to the radio communication terminal apparatus, the aggregation level being a first number of CCEs occupied by the control information, wherein:

the first number of CCEs within the second search space being distributed among the plurality of downlink component bands in units of a second number of CCEs, the second number of CCEs being one of the aggregation levels that are less than or equal to the threshold value.

* * * * *